April 7, 1931.   C. F. RAUEN   1,799,987
POWER TRANSMISSION
Filed May 29, 1923
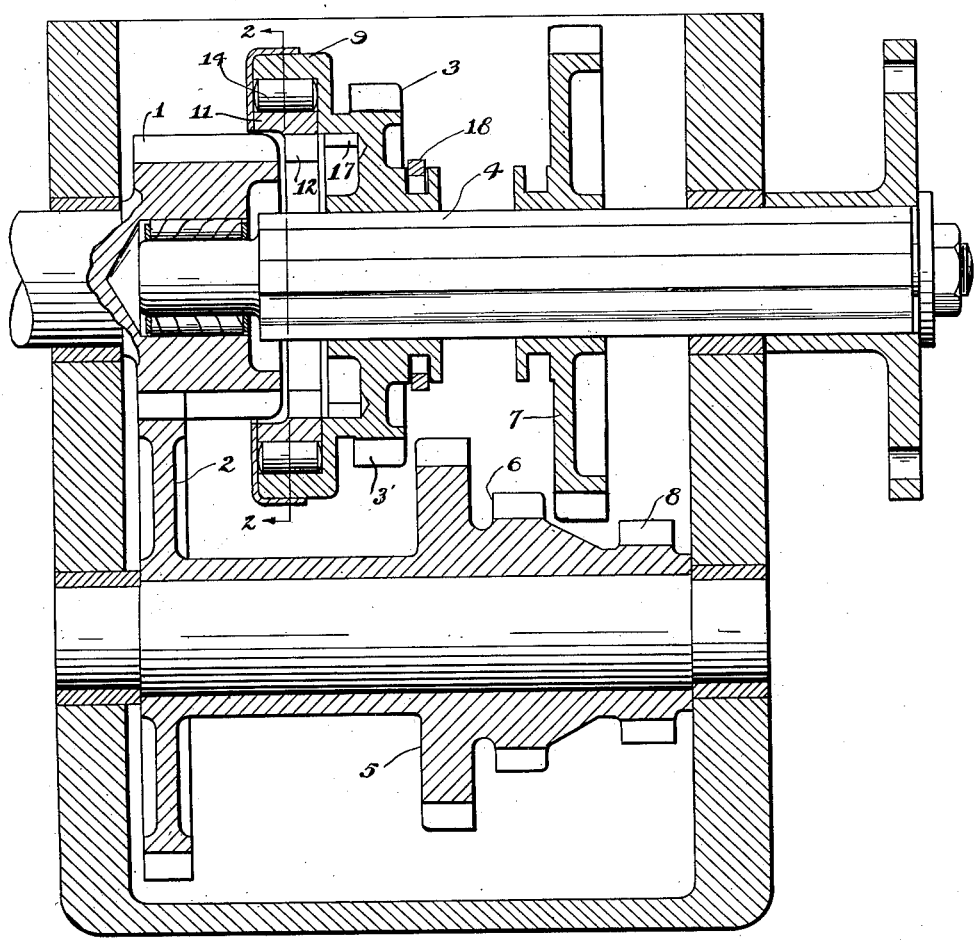
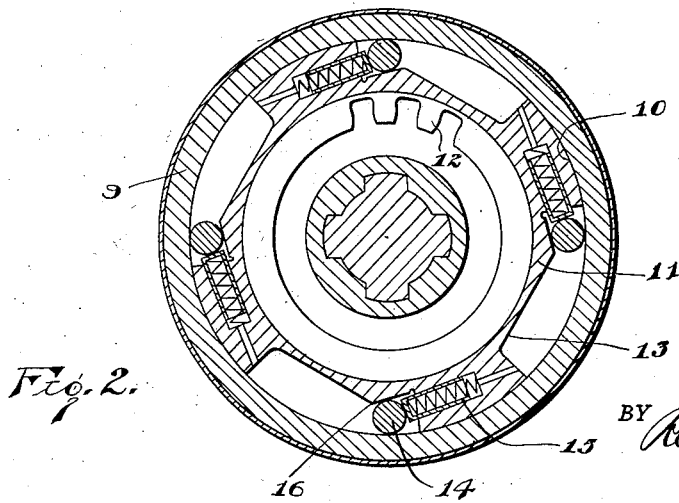
Fig.1.
Fig.2.
INVENTOR
Carl F. Rauen
BY Robert H. Young
ATTORNEY Patented Apr. 7, 1931

1,799,987

UNITED STATES PATENT OFFICE

CARL F. RAUEN, OF DAYTON, OHIO

POWER TRANSMISSION

Application filed May 29, 1923. Serial No. 642,300.

This invention relates to power transmission systems and the object of the same is to provide a transmission whereby the prime mover will automatically be disengaged from the driven part when the speed of the latter exceeds the speed of the prime mover, with the provision for further operation so that the driven part may drive the prime mover if so desired.

Further objects and advantages will be more fully set forth in the attached specification and claims.

In the drawings;

Fig. 1 is a vertical section through a transmission gear box and Fig. 2 is a vertical section on the line 2—2 of Fig. 1.

The drawings show my invention as applied to a transmission gear box of a motor vehicle as one adaptation of the same. A stem gear 1 is connected to the motor or prime mover in the customary manner through a suitable clutch device not shown, and meshes with the countershaft gear 2. The second speed sliding gear 3 is suitably splined to the transmission shaft 4, which is connected in the customary manner to the drive wheels of the vehicle. This gear 3 is provided with external teeth 3' which engage with the teeth on a second speed countershaft gear 5 when the gear 3 is moved from its position as shown in Fig. 1, to the right. A low speed gear 6 is provided on the countershaft and the sliding low speed gear 7 is suitably splined on the shaft 4. The gear 7 is adapted to mesh with the gear 6 or adapted to mesh with the reverse idler gear, not shown, which engages with the reverse countershaft gear 8.

Instead of engaging the gear 3 with the stem gear 1 in the customary manner for the direct drive of the shaft 4 from the motor, means are provided as will now be more fully described so that the gear 3 may be connected through an overrunning clutch to the stem gear 1.

The sliding gear 3 is provided integrally therewith with the cylinder 9 which is the shell of an over-running clutch 10. A cam member 11 is provided with internal teeth 12 which are adapted to engage with teeth on the stem gear 1 when the cam member is moved from its position as shown in Fig. 1, to the left. This cam member is provided with cut-away portions 13, within each of which is a roller 14 adapted to be pressed by spring 15 so as to be urged by this spring away from its position in the end of the cut-away portion as more fully shown in Fig. 2. The cut-away portions are suitably tapered, the distance between the point 16 of each cut-away portion and the fixed outer shell member 9 being smaller than the diameter of the roller. It will be seen, therefore, that the springs and the rollers will prevent a clockwise rotation of the shell member 9 in relation to the cam member 11 so that when the cam member 11 is driven counter-clockwise it will drive the shell portion 9. When the teeth 12 of the cam 11 are engaged with the teeth of the stem gear 1 by a movement to the left of the gear 3, and the over-running clutch members, the motor will be connected through the over-running clutch so as to drive the shell portion 9 and the gear 3. When the speed of the car increases, as for instance when it is coasting down hill with the clutch engaged and the engine idling or running slower than the shaft 4, free coasting will be permitted without disengaging the clutch and without moving the gear 3 by means of this over-running clutch arrangement.

Internal teeth 17 are provided on the gear 3 and are adapted to engage the teeth of the stem gear 1 when the gear 3 is moved further to the left so that the stem gear 1 may be directly and positively connected to the shaft 4. The gear 3 is moved by suitable fork arrangement 18 operating in a groove in the gear 3 in the customary manner. It will therefore be seen that means have been provided for coupling the driving shaft to the driven shaft through an overrunning clutch, the device being also operable to positively connect the shafts together when so desired, so that the engine may be used as a brake in descending steep hills, or, if desired, free coasting may be permitted without entirely disengaging the engine from the drive wheels. The advantages of such an arrangement are obvious as the power is available at any instant without following the customary procedure of again engaging the gears or the clutch when freely coasting.

I claim:

1. In a change speed gear box of a motor vehicle, a driving shaft, a driven shaft in alignment therewith, a countershaft and gearing cooperating with said driving shaft and driven shaft, an overrunning clutch member mounted on said driven shaft to rotate therewith, means for coupling said driving and driven shafts together through said overrunning clutch member, said means being also operable to positively connect said shafts together.

2. In a power transmission, a drive shaft, a countershaft cooperating therewith, and a driven shaft in alignment with said drive shaft, a spur gear on said drive shaft, a clutch gear on said driven shaft having internal clutch teeth adapted to clutch said spur gear, said clutch gear also having external teeth to be driven from said countershaft, an internally toothed member, an overrunning clutch interconnecting said member and said clutch gear, and means for moving said clutch gear and said member together so that said member alone is engaged with said spur gear or so that said clutch gear is engaged with said spur gear.

3. In a power transmission for engines, a drive shaft, a driven shaft provided with different sized gears in alignment with said drive shaft, a countershaft cooperating with said drive and driven shafts and also provided with different sized gears so that the said driven shaft may be driven at different speeds in the same direction as the drive shaft, means surrounding said driven shaft for coupling said drive and driven shafts together through an overrunning clutch so that the driven shaft can overrun the drive shaft, and means to positively connect said drive and driven shafts together so that the drive and driven shafts turn at the same speed.

4. In a power transmission for engines, a drive shaft, a driven shaft having different sized gears in alignment with said drive shaft, a countershaft cooperating with said drive shaft and said driven shaft and also provided with different sized gears so that said driven shaft may be driven at different speeds in the same direction as said drive shaft, an overrunning clutch member mounted on the driven shaft and in axial alignment with said drive and driven shafts, and adapted to rotate with said driven shaft, means for coupling said drive and driven shafts together through said overrunning clutch member so that the driven shaft can overrun the drive shaft, and means to positively connect said drive and driven shafts together so that they turn at the same speed.

5. In a power transmission for engines, a drive shaft, a driven shaft in alignment with said drive shaft, a countershaft cooperating with said drive shaft and said driven shaft provided with different sized gears so that said driven shaft may be driven at different speeds in the same direction as said drive shaft, means on said drive and driven shafts for coupling said drive and driven shafts together through an overrunning clutch so that the driven shaft can overrun the drive shaft, and means mounted on said coupling means to positively connect said drive and driven shafts together.

6. In a power transmission for engines, a drive shaft, a driven shaft provided with different sized gears in alignment with said drive shaft, a countershaft cooperating with said drive and driven shafts and also provided with different sized gears so that the said driven shaft may be driven at different speeds in the same direction as the drive shaft, means surrounding said driven shaft for coupling said drive and driven shafts together through an overrunning clutch so that the driven shaft can overrun the drive shaft only in high gear, and means to positively connect said drive and driven shafts together, so that the drive and driven shafts turn at the same speed.

7. A motor vehicle drive comprising, a change speed transmission including driving and driven shafts and a countershaft and gearing cooperating therewith, an overrunning clutch member shiftable into position to connect the driving and driven shafts in the transmission to permit a one-way drive, a device for controlling said clutch member, and means for directly connecting said shafts independently of the clutch member to provide a two-way drive.

8. A motor vehicle drive comprising, a drive shaft, a driven shaft, a single slidable means embodying an overrunning clutch to connect said shafts together through said overrunning clutch to permit overrunning of the driven shaft under the momentum of the latter and to directly connect the shafts together, and other means for connecting the shafts together for rotation in the same direction for driving one shaft from the other shaft at a different speed than the direct connection.

9. A motor vehicle drive comprising, a drive shaft, a driven shaft, means slidable with respect to one of said shafts to connect said shafts together through an overrunning clutch to permit overrunning of the driven shaft under the momentum of the latter and for directly connecting said shafts together, and other means for connecting the shafts together for rotation in the same direction for driving one shaft from the other shaft at a different speed than the direct connection.

10. A motor vehicle drive comprising, a drive shaft, a driven shaft, sliding means for connecting the shafts together through an overrunning clutch to permit overrunning of the driven shaft under the momentum of the latter, other means slidable with the first named means for directly connecting the shafts together for a one-to-one drive ratio, and other means for driving one of said shafts from the other shaft in the same direction at a speed other than a one-to-one ratio.

11. A motor vehicle drive comprising, change speed gearing, aligned shafts in end-to-end relation, a clutch body non-rotatably carried by each of said shafts, means for establishing a direct one-way drive connection between said bodies, means carried by one of said bodies and movable into engagement with the other of said bodies to establish a two-way drive between said bodies, and means for driving one of said shafts through said change speed gearing.

12. A motor vehicle drive comprising, change speed gearing, a pair of aligned shafts in end-to-end relation, a clutch body non-rotatably carried by each of said shafts, means for establishing a direct one-way drive connection between said bodies, means carried by one of said bodies and movable into engagement with the other of said bodies to establish a direct two-way drive between said bodies, and means for driving one of said shafts through said change speed gearing.

13. A motor vehicle drive comprising, change speed gearing, a pair of shafts in end-to-end relation, a clutch body non-rotatably carried by each of said shafts, means attached to one of said bodies and operable to establish a direct one-way drive connection between said bodies, means carried by one of said bodies and movable into engagement with the other of said bodies to establish a two-way drive between said bodies, and means for operatively connecting said change speed gearing with one of said shafts.

14. A motor vehicle drive comprising, change speed gearing, a pair of shafts in end-to-end relation, a clutch body non-rotatably carried by each of said shafts, one of said clutch bodies having peripheral clutch means, means for establishing a direct one-way drive connection between said bodies, means carried by one of said clutch bodies and movable into engagement with said peripheral clutch means carried by the other of said bodies to establish a direct two-way drive between said shafts, and means for operatively connecting said change speed gearing with one of said shafts.

15. A motor vehicle drive comprising, change speed gearing, a pair of shafts in end-to-end relation, means on one of said shafts carrying clutch means, a clutch body on the other shaft, means affording through the first mentioned means a one-way direct drive connection between said clutch means and said clutch body, means carried by the clutch body engageable with the clutch means to establish a two-way drive between said shafts, and means for driving one of said shafts through said change speed gearing.

16. A motor vehicle drive comprising, change speed gearing, aligned shafts, one of said shafts having a hollow clutch member keyed thereon, means affording a one-way direct drive connection between said hollow clutch member and the second shaft, peripheral teeth formed on the second shaft, means having internal clutch teeth engageable with the said peripheral clutch teeth to establish a two-way drive between said shafts, and means for operatively connecting said change speed gearing with one of said shafts.

17. A motor vehicle drive comprising, change speed gearing, a pair of shafts, an overrunning clutch structure to establish a one-way drive between said shafts, said clutch structure including two parts, each part having a set of teeth, means for interconnecting said sets of teeth to establish a two-way drive between said shafts, and means for driving one of said shafts through said change speed gearing.

18. A change speed gearing mechanism comprising, drive and driven members, an overrunning clutch for connecting said members for a one-way drive, change speed gearing, a shift device for effecting through said change speed gearing a change in speed of the driven member and for controlling said overrunning clutch, and means carried by said overrunning clutch and controlled by said shift device to establish a direct two-way drive between said members.

19. A motor vehicle drive comprising, driving and driven shafts, clutch mechanism affording a one-way drive, means associated with said clutch mechanism for effecting a two-way direct drive between said driving and driven shafts, additional means associated with said clutch mechanism for effecting a change of speed of said driven shaft, a single means for moving said clutch mechanism to selectively establish said one-way and two-way drives, and a change in speed of said driven shaft.

20. A change speed mechanism comprising, drive and driven members, change speed gearing for varying the speed of the driven member, means providing selectively a one-way and a two-way drive between said members, and a device controlling said means for establishing by movement thereof in a single direction said one-way and two-way drives between said members, said change speed gearing including means operable upon a reverse movement of said device to obtain a different speed of the driven member than that obtained through said one-way and two-way drives.

21. A motor vehicle transmission comprising, driving and driven parts, change speed gearing for varying the speed of the driven part, an overrunning clutch comprising a plurality of members, one of said members being mounted for rotation with one of said parts, and a device for progressively connecting said clutch members to the other part to establish respectively a one-way drive and a two-way drive between said parts, said change speed gearing including means operable upon a reverse movement of said device to obtain a different speed of the driven part than that obtained through said one-way and two-way drives.

22. A change speed mechanism comprising, driving and driven members, change speed gearing for varying the speed of the driven member, means including a longitudinally shiftable overrunning clutch carried by one of said members for establishing a one-way drive between the said members, means for establishing a direct two-way drive between said members, and a shifting device for controlling both of said means and for obtaining through said change speed gearing a different speed of the driven member than that obtained through said one-way and two-way drives.

23. A transmission mechanism comprising, driving and driven parts, change speed gearing, an overrunning clutch member rotatable with one of said parts, means for moving said clutch member for coupling said parts together through said clutch member so that the driven part can overrun the driving part, and means movable with said clutch member to connect, upon further movement of the clutch member in the same direction, said drive and driven parts together for a two-way drive, said means being also movable to obtain a different speed of the driven part than that obtained through said one-way and two-way drives.

24. A motor vehicle drive comprising, drive and driven parts, change speed gearing, means affording one-way drive and a two-way drive between said parts, and a movable member for effecting through said change speed gearing a change in speed of the driven part, said member being also movable to selectively bring said means into operation to establish said one-way and said two-way drives.

25. A motor vehicle transmission comprising, drive and driven shafts, change speed gearing, overrunning clutch members for connecting said shafts together for a one-way drive, clutch teeth on said members, clutch elements carried by one of said shafts engageable with the teeth of both of said overrunning clutch members to prevent relative motion between said members, and shiftable means for controlling the clutching of said members to establish a one-way drive between said shafts and further movable in the same direction to establish a two-way drive between said shafts, said change gearing including means operable upon movement of said shiftable means in a reverse direction to obtain a different speed of the driven shaft than that obtained through said one-way and two-way drives.

26. A motor vehicle comprising, drive and driven members, change speed gearing, a device for controlling the operation of the vehicle, and instrumentalities simultaneously movable in the same direction for connecting said members and controlled by said device for affording respectively a one-way drive and a direct two-way drive between said members, said change speed gearing including means operable upon a reverse movement of said device to obtain a different speed of the driven member than that obtained through said one-way and two-way drives.

27. A motor vehicle transmission comprising, drive and driven members, change speed gearing, a gear shift device for controlling the operation of the vehicle, and instrumentalities controlled by said device for affording selectively a one-way and a two-way drive between said members, said device being shiftable to a position to establish a one-way drive and, upon further movement in the same direction, a two-way drive between said members, said change speed gearing including means operable upon a reverse movement of said device to obtain a different speed of the driven member than that obtained through said one-way and two-way drives.

In testimony whereof I affix my signature.

CARL F. RAUEN.